United States Patent
Suk et al.

(10) Patent No.: US 6,754,024 B2
(45) Date of Patent: Jun. 22, 2004

(54) SYSTEM AND METHOD FOR REDUCING THE ACCUMULATION OF ACTUATOR BEARING GREASE IN HARD DISK DRIVES

(75) Inventors: Mike Suk, San Jose, CA (US); Mike L. Ramirez, San Jose, CA (US); Charles S. Spencer, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 09/887,373

(22) Filed: Jun. 22, 2001

(65) Prior Publication Data

US 2002/0196574 A1 Dec. 26, 2002

(51) Int. Cl.$^7$ .............................................. G11B 15/18
(52) U.S. Cl. .......................................... 360/69; 360/75
(58) Field of Search ........................... 360/69, 128, 71, 360/255.7, 75

(56) References Cited

U.S. PATENT DOCUMENTS

| | | | |
|---|---|---|---|
| 5,633,848 A | 5/1997 | Masaki et al. | 369/71 |
| 6,084,753 A | 7/2000 | Gillis et al. | 360/128 |
| 6,519,115 B1 * | 2/2003 | Yaeger | 360/255.7 |

FOREIGN PATENT DOCUMENTS

JP     2000090612 A     3/2000

* cited by examiner

*Primary Examiner*—David Hudspeth
*Assistant Examiner*—Mitchell Slavitt
(74) *Attorney, Agent, or Firm*—John L. Rogitz

(57) ABSTRACT

A method for reducing the accumulation of actuator bearing grease in hard disk drives includes periodically forcing the disk drive into multiple unload/load cycles after extended read/write sessions wherein the disk drive has not unloaded. While the disk drive is unloading, the current required to unload the read/write head is monitored. Based on the value of the current, the frequency of the unload/load cycle is adjusted.

17 Claims, 2 Drawing Sheets

SYSTEM AND METHOD FOR REDUCING THE ACCUMULATION OF ACTUATOR BEARING GREASE IN HARD DISK DRIVES

TECHNICAL FILED

The present invention relates generally to actuator arms found in hard disk drives.

BACKGROUND OF THE INVENTION

Conventional hard disk drives include multiple storage disks having read/write surfaces on which data is stored. These disk drives also include multiple actuator arms, e.g., one actuator arm for each disk. Each actuator arm supports a read/write head. The read/write heads are used to read data from or write data to the storage disks. When fully operational, server class disk drives may read or write data for relatively long periods of time before being shut down. In the case of load/unload drives, the sliders that support the read/write heads may not be unloaded from the disk surface for several months at a time. If the read/write heads are not unloaded from the disk, the actuator arms do not have a chance to move beyond the outer diameter of the storage disks. Consequently, grease can accumulate in the actuator bearings just beyond the outer limits of motion of the actuator arms during the extended read/write session.

The actuator arms must overcome the accumulated grease when unloading after an extended load period. Typically, this is not troublesome if the unload sequence is servo-controlled. However, if the drive is shut down and the unloading is driven by the hardware unload algorithm, i.e., open loop control, the actuator arms may not overcome the accumulated grease. As a result, the sliders may not fully unload—if they unload at all. Accordingly, there is a need to periodically reduce the accumulation of grease in the actuator bearings.

SUMMARY OF THE INVENTION

A method for reducing the accumulation of actuator bearing grease in a disk drive includes monitoring an elapsed disk drive operating time. Based on the monitoring act, the actuator is forced through one or more unload/load cycles. In a preferred embodiment, a current required to unload the disk drive is monitored and it is determined whether the current is within a predetermined range of current operating levels. If the current falls outside the predetermined range, the frequency of the unload/load cycles is adjusted. Preferably, the unload/load cycle is repeated a predetermined number of times. Moreover, in a preferred embodiment, the elapsed time is an elapsed time without a disk unload.

In another aspect of the present invention, a disk drive includes a disk that has a read/write surface. The disk drive also includes an actuator arm that supports a read/write head. The actuator arm is rotatably mounted on an actuator bearing and the read/write bead moves across the read/write surface as the actuator arm rotates. In this aspect, the disk drive includes a controller that includes a computer program that has logic means for reducing the accumulation of grease in the actuator bearing.

In yet another aspect of the present invention, a computer program device includes means for forcing at least one unload/load cycle in a disk drive to ameliorate grease build-up.

The preferred embodiment of the present invention will now be described, by way of example, with reference to the accompanying drawings, in which:

DESCRIPTION OF AN EMBODIMENT OF THE INVENTION

Figure 1:
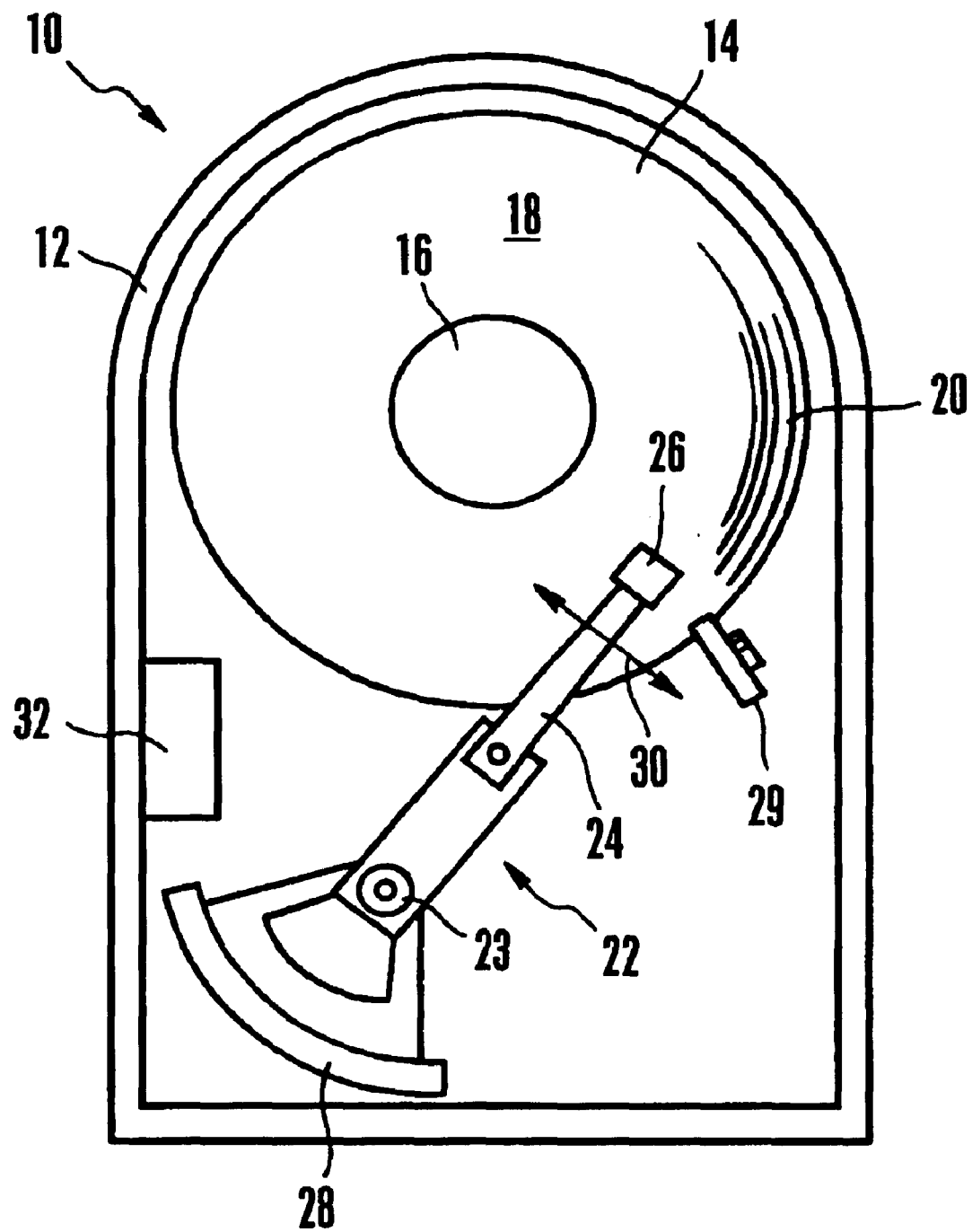
FIG. 1 is a top plan view of a hard disk drive.

Referring initially to FIG. 1, a disk drive is shown and generally designated 10. FIG. 1 shows that the disk drive 10 includes a housing 12. Within the housing 12 is at least one disk 14 mounted on a spindle 16. Furthermore, the disk 14 includes a read/write surface 18 having plural concentric data tracks 20. As shown in FIG. 1, the disk drive 10 also includes an actuator arm 22. The actuator arm 22 is mounted on an actuator bearing 23. A suspension arm 24 extends from the actuator arm 22 and supports a read/write head 26. The actuator arm 22 is driven by an actuator coil 28, e.g., a voice coil motor (VCM), and as the actuator arm 22 pivots back and forth, as indicated by arrow 30, the read/write head 26 moves across the data tracks 20 of the disk 14.

FIG. 1 shows a ramp 29 placed just outside the outer periphery of the disk 14. As the actuator arm 22 moves toward the outer periphery of the disk 14, the read/write head 26 slides up the ramp 29 and is lifted away from the read/write surface 18 of the disk 14. FIG. 1 also shows a controller 32 that is connected to the actuator coil 28. The method for reducing the accumulation of grease in the actuator bearing 23, disclosed below, may be executed as a series of instructions by a digital processor within the controller 32.

While the preferred implementation of the digital processor is a control circuit within the controller 32, the processor can be a personal computer or any computer, including a Unix computer, or OS/2 server, or Windows NT server, or a laptop computer, or a hand-held computer. Unix is a registered trademark of The Open Group in the United States and other countries. OS/2 is a registered trademark of International Business Machines Corporation in the United States, other countries, or both. Windows NT is a trademark of Microsoft Corporation in the United States, other countries, or both. Moreover, the digital processor includes a series of computer-executable instructions, as described below, which will force the disk drive 10 to periodically unload in order to reduce the accumulation of grease in the actuator bearing at the outer motion limits of the actuator arm during an extended read/write session. These instructions may reside, for example, in random access memory (RAM) of the controller 32.

Alternatively, the instructions may be contained on a data storage device with a computer readable medium, such as a computer diskette. Or, the instructions may be stored on a magnetic tape, hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be lines of C++ compatible code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 2:
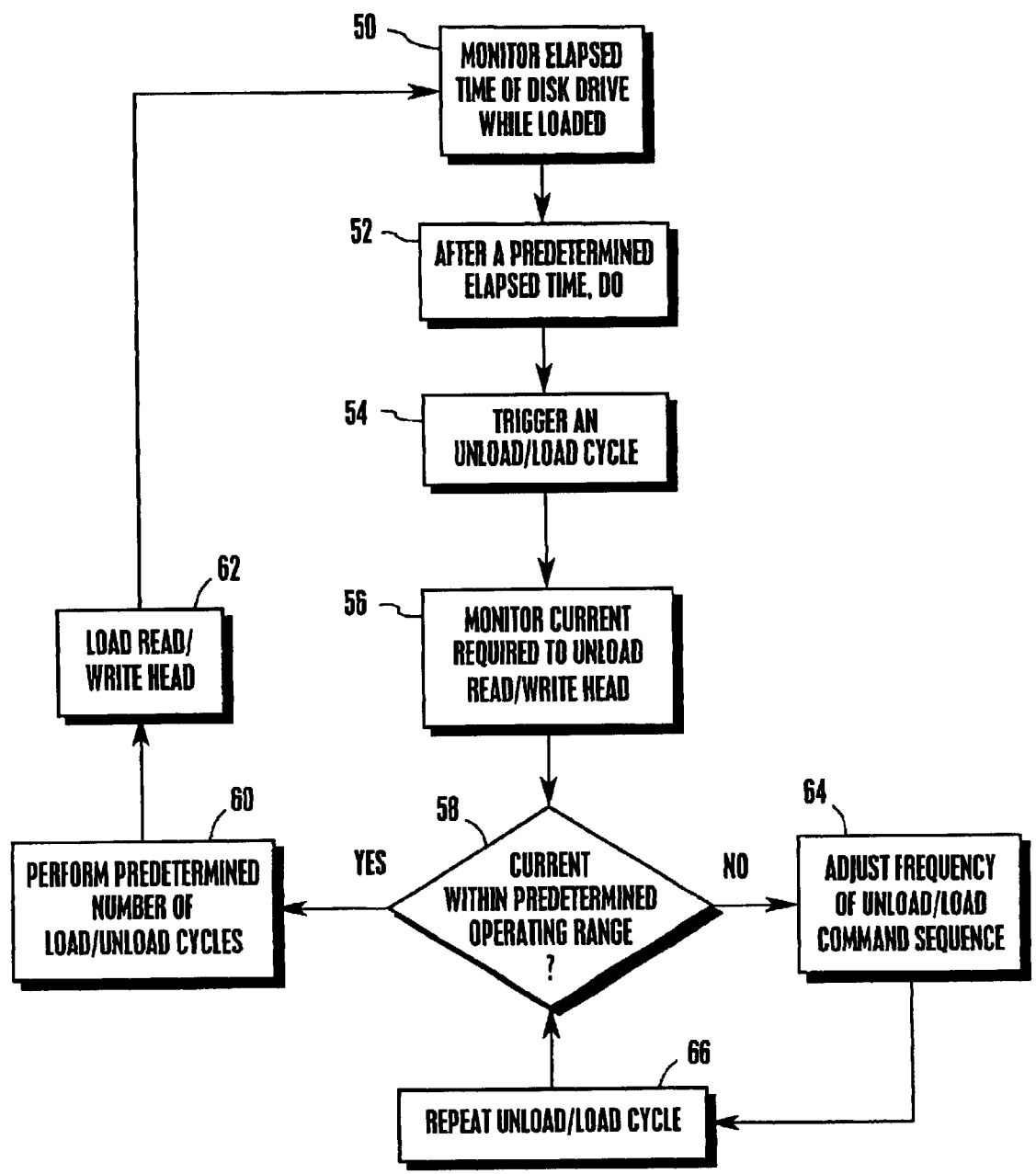
FIG. 2 is a flow chart of the operating logic of the present invention.

Referring to FIG. 2, the operating logic of the present invention is shown and commences at block 50 wherein the elapsed operating time of the disk drive while loaded is monitored. Then, at block 52 a do loop is entered wherein after a predetermined elapsed time without the drive having been unloaded, the following steps are performed. Proceeding to block 54, at least one and preferably several unload/load cycles are triggered. At block 56, while the read/write head 26 is unloading, the current required to unload the read/write head 26 is monitored.

Continuing to decision diamond 58, it is determined whether the current required to unload the read/write head 26 is within a predetermined operating range. If so, the logic moves to block 60 and a predetermined number of load/unload cycles are performed to further ameliorate any grease build-up in the actuator bearing 23. The logic then proceeds to block 62 where the read/write head 26 is loaded for continued use, i.e., to read data from and write data to the disk 14. Next, the logic returns to block 50 and starts over.

In contrast, if at decision diamond 58 the current is not within the predetermined operating range, the logic continues to block 64 where the frequency of the unload/load command sequence is adjusted. For example, if the current is too high, indicating a relatively higher accumulation of grease in the actuator bearing 23, the unload/load command sequence will be repeated more frequently and more cycles can be used. On the other hand, if the current is too low, the unload/load command sequence will be repeated less frequently or maintained where it is.

Moving to block 66, the unload/load cycle is repeated. Then, the logic returns to decision diamond 58 to again determine if the current is within the predetermined operating range. This loop of the logic continues as described above until a "yes" is returned at decision diamond 58. If a "yes" is returned, the logic moves to block 60 and continues as described above.

With the configuration of structure described above, it is to be appreciated that system and method described above provides a means for reducing the harmful accumulation of actuator bearing grease in hard disk drives. Thus, the likelihood of drive failure while unloading is reduced.

While the particular SYSTEM AND METHOD FOR REDUCING THE ACCUMULATION OF ACTUATOR BEARING GREASE IN HARD DISK DRIVES as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A method for reducing the accumulation of actuator bearing grease in a disk drive, comprising the acts of:
   monitoring an elapsed disk drive operating time; and
   at least partially based on the monitoring act, moving the disk drive through at least one unload/load cycle.

2. The method of claim 1, further comprising the act of:
   monitoring a current required to unload the disk drive.

3. The method of claim 2, further comprising the act of:
   determining whether the current is within a predetermined range of current operating levels; and
   adjusting a frequency of unload/load cycles if the current falls outside the predetermined range.

4. The method of claim 3, further comprising the act of:
   repeating the unload/load cycle a predetermined number of times.

5. The method of claim 1, wherein the elapsed time is an elapsed time without a disk unload.

6. A disk drive, comprising:
   at least one disk, the disk having at least one read/write surface;
   at least one actuator arm supporting a read/write head, the actuator arm being rotatably mounted on an actuator bearing, the read/write head moving across the read/write surface as the actuator arm rotates; and
   a controller connected to the actuator arm, the controller including a computer program having logic means for reducing the accumulation of grease in the actuator bearing.

7. The disk drive of claim 6, wherein the computer program comprises:
   means for monitoring an elapsed disk drive operating time without an unload; and
   means for moving the disk drive through at least one unload/load cycle at least partially in response to the monitoring means.

8. The disk drive of claim 7, wherein the computer program further comprises:
   means for monitoring at least one electrical parameter required to unload the disk drive.

9. The disk drive of claim 8, wherein the computer program further comprises:
   means for determining whether the parameter bears a predetermined relationship to a threshold; and
   means for adjusting a frequency of unload/load cycles based on the determining means.

10. The disk drive of claim 8, wherein the parameter is current.

11. The disk drive of claim 9, wherein the computer program further comprises:
    means for repeating the unload/load cycle a predetermined number of times.

12. A computer program device, comprising means for forcing at least one unload/load cycle in a disk drive to ameliorate grease build-up.

13. The computer program device of claim 12 wherein the forcing means comprises:

a computer readable medium having a program of instructions thereon for reducing the accumulation of actuator bearing grease in a disk drive, comprising:

means for monitoring an elapsed disk drive operating time without an unload; and means for moving the disk drive through at least one unload/load cycle at least partially in response to the monitoring means.

14. The computer program device of claim 13, wherein the computer readable medium further comprises:

means for monitoring an electrical parameter required to unload the disk drive.

15. The computer program device of claim 14, wherein the computer readable medium further comprises:

means for determining whether the parameter bears a predetermined relationship to a threshold; and means for adjusting a frequency of unload/load cycles based on the determining means.

16. The computer program device of claim 14, wherein the parameter is current.

17. The computer program device of claim 15, wherein the computer readable medium further comprises:

means for repeating the unload/load cycle a predetermined number of times.

* * * * *